US010308328B2

(12) United States Patent
Siegfriedsen (10) Patent No.: US 10,308,328 B2
(45) Date of Patent: Jun. 4, 2019

(54) FLOATING WIND TURBINE WITH A FLOATING FOUNDATION, AND METHOD FOR INSTALLATION OF SUCH A WIND TURBINE

(71) Applicant: AERODYN ENGINEERING GMBH, Budelsdorf (DE)

(72) Inventor: Sonke Siegfriedsen, Rendsburg (DE)

(73) Assignee: Aerodyn Engineering GMBH, Budelsdorf (DE)

( * ) Notice: Subject to any disclaimer, the term of this patent is extended or adjusted under 35 U.S.C. 154(b) by 307 days.

(21) Appl. No.: 15/313,753

(22) PCT Filed: Jun. 5, 2015

(86) PCT No.: PCT/DE2015/100225
§ 371 (c)(1),
(2) Date: Nov. 23, 2016

(87) PCT Pub. No.: WO2016/000681
PCT Pub. Date: Jan. 7, 2016

(65) Prior Publication Data
US 2017/0190391 A1    Jul. 6, 2017

(30) Foreign Application Priority Data

Jul. 1, 2014   (DE) .................... 10 2014 109 212

(51) Int. Cl.
| *B63B 35/44* | (2006.01) |
| *B63B 21/50* | (2006.01) |
| *B63B 1/12*  | (2006.01) |
| *F03D 13/20* | (2016.01) |
| *F03D 13/25* | (2016.01) |
| *F03D 13/10* | (2016.01) |
| *B63B 21/20* | (2006.01) |
| *B63B 21/26* | (2006.01) |
| *F03D 1/06*  | (2006.01) |

(52) U.S. Cl.
CPC .............. *B63B 35/44* (2013.01); *B63B 1/125* (2013.01); *B63B 21/20* (2013.01); *B63B 21/26* (2013.01);
(Continued)

(58) Field of Classification Search
CPC .......... B63B 35/44; B63B 1/125; F03D 13/10
See application file for complete search history.

(56) References Cited

U.S. PATENT DOCUMENTS 6,979,171 B2 * 12/2005 Lauritsen ............... F03D 13/25
                                                 415/4.3
7,156,586 B2 *  1/2007 Nim ....................... B63B 35/44
                                                 405/195.1
(Continued)

FOREIGN PATENT DOCUMENTS

| DE | 10 2008 031 042 | 12/2009 |
| EP | 2 271 547       | 3/2014  |
| WO | 2011/014075     | 2/2011  |

*Primary Examiner* — S. Joseph Morano
*Assistant Examiner* — Jovon E Hayes
(74) *Attorney, Agent, or Firm* — Diederiks & Whitelaw, PLC.

(57) ABSTRACT

A floating downwind turbine comprising: a floating foundation; a tower which is rotationally fixed on the floating foundation; an energy conversion unit which is mounted on the tower, comprises a rotor and is rotationally fixedly connected to the tower; and at least one tensioning element which connects the tower or the energy conversion unit to the foundation in the upwind direction, the foundation having three legs, one leg of which is longer than the other two legs, the legs being interconnected in a Y shape and the tower, being arranged on the foundation in the connecting region of the legs, and the longest leg extending in the upwind direction and being connected to the tower or to the energy conversion unit by the tensioning element.

26 Claims, 9 Drawing Sheets

(52) U.S. Cl.
CPC .......... *B63B 21/50* (2013.01); *F03D 1/0675* (2013.01); *F03D 13/10* (2016.05); *F03D 13/22* (2016.05); *F03D 13/25* (2016.05); *B63B 2001/128* (2013.01); *B63B 2021/203* (2013.01); *B63B 2035/446* (2013.01); *F05B 2230/60* (2013.01); *F05B 2240/93* (2013.01); *F05B 2240/95* (2013.01); *Y02E 10/721* (2013.01); *Y02E 10/727* (2013.01); *Y02P 70/523* (2015.11)

(56) References Cited

U.S. PATENT DOCUMENTS

| | | | |
|---|---|---|---|
| 7,612,462 B2* | 11/2009 | Viterna | B63B 21/50 290/42 |
| 8,118,538 B2* | 2/2012 | Pao | B63B 21/50 415/115 |
| 8,373,299 B2* | 2/2013 | Sharples | F03D 1/0608 290/44 |
| 8,622,011 B2* | 1/2014 | Jahnig | B63B 1/107 114/267 |
| 8,692,401 B2* | 4/2014 | Roddier | B63B 35/44 290/44 |
| 8,729,723 B2 | 5/2014 | Boureau et al. | |
| 8,729,732 B2 | 5/2014 | Boureau et al. | |
| 2006/0165493 A1* | 7/2006 | Nim | B63B 35/44 405/223.1 |
| 2008/0240864 A1* | 10/2008 | Belinsky | E02D 27/42 405/223.1 |
| 2009/0092449 A1* | 4/2009 | Sveen | B63B 21/50 405/224 |
| 2009/0249707 A1* | 10/2009 | Curme | E04H 12/10 52/40 |
| 2011/0283640 A1* | 11/2011 | Miller | E02D 27/42 52/292 |
| 2014/0017083 A1* | 1/2014 | Pineda Amo | F03D 7/06 416/37 |
| 2016/0230746 A1* | 8/2016 | Dagher | F03D 13/10 |

* cited by examiner

FLOATING WIND TURBINE WITH A FLOATING FOUNDATION, AND METHOD FOR INSTALLATION OF SUCH A WIND TURBINE

CROSS REFERENCE TO RELATED APPLICATIONS

This application represents the U.S. National Stage of International Application No. PCT/DE2015/100225, filed 5 Jun. 2015 which claims priority from and the benefit of German Patent Application No. 10 2014 109 212.0 filed on 1 Jul. 2014. The entire contents of these applications are incorporated herein by reference.

BACKGROUND OF THE PRESENT INVENTION

The invention relates to a floating wind turbine comprising a floating foundation, a tower arranged on the floating foundation, and an energy conversion unit which is mounted on the tower and comprises a rotor, the wind turbine being designed as a downwind turbine, the floating foundation being rotatable anchored, and the tower being rotationally fixedly connected to the floating foundation on the one hand and the energy conversion unit on the other hand.

Floating wind turbines for large water depths are for example known from EP 2 271 547 B1. Such structures consists in particular from a frame that is designed in the shape of an isosceles triangle in a top view, at whose apexes the columns are arranged, the tower of the wind turbine being erected on one of these columns or, supported centrally by a bearing structure, between the columns.

However, a disadvantage of this design is the complexity of the construction and the high labour expenditure for manufacturing the frame. The known installation in particular requires a relatively large horizontal and vertical extent for taking up the forces occurring at the rotor of the wind turbine, and therefore depends both for the construction and also for the installation on great water depths.

The German patent application No. 10 2014 102 481.8 previously filed by the applicant already describes a floating wind turbine having the features mentions initially, that exhibits a foundation arranged below the water line and formed from a plurality of buoyancy bodies, the foundation basically having to be regarded as an extension of the tower of the wind turbine. There it is particularly provided that the tower of the wind turbine that is designed as a downwind turbine is rotationally fixedly connected to the foundation on the one hand and to the energy conversion on the other hand and the floating foundation is rotationally anchored and the tower exhibits, at least in sections, a profile that supports wind direction tracking. Even though the system is designed for use in deep waters having depths >200 m, since for vertically stabilizing the system a relatively long section, formed by the foundation, is required under water. However, the onshore manufacture of the system requires less space than for the system initially mentioned.

EP 1 269 018 B1 finally discloses a wind turbine that exhibits, as the foundation, a catamaran-like buoyancy body and is particularly suitable for installation in shallow waters. This system is designed as a downwind turbine, where likewise a yaw bearing having a yaw drive being dispensed with as a result of the fixed connection from tower to foundation on the one hand and tower to the energy conversion unit on the other hand and it instead being provided that the system, by means of chains or ropes, is anchored to an anchoring point rotatable about the latter, so that the system automatically aligns itself according to the prevailing wind direction.

In the wind direction, the tower exhibits an aerodynamic profile for minimizing the lee side and exhibits in particular a stiffening element that runs from the upper tower area upwind, for example designed as a rope, that is connected to the foundation.

However, the disadvantage here is the catamaran-like design of the foundation and the arrangement of the tower on a web connecting the buoyancy bodies, so that the loads occurring at the rotor and/or at the energy conversion unit are dissipated into the foundation in a rather one-sided manner and the floating wind turbine tends to list.

In addition to the construction of offshore wind turbines themselves, it is also their installation that represents a particular challenge. A high degree of completion is in principle desirable onshore, so that the offshore installation can take place with relatively low effort and during a short period of time. In this manner the offshore wind turbine known from the previously mentioned EP 2 271 547 B1 is completely produced onshore and towed to the location of its use where it is anchored on the sea bed by means of a plurality of anchor chains.

The disadvantage of this anchoring is, however, the high effort for decoupling the mooring lines that anchor the offshore wind turbine and also the electrical connection to the submarine cable so that in the case of maintenance or repair, if the system is to be towed again into the harbour, long downtimes have to be expected despite assumed favourable weather conditions.

SUMMARY OF THE INVENTION

A first objective of the invention is therefore so to improve the structure of the last two mentioned floating wind turbines relative to their foundation that a compact and stable floating wind turbine is created that is of simple structure, can be produced with little labour outlay and on top on this is suitable in terms of its basic construction for waters both with a low and also with a great depth. The further object of the invention is to create a simple method that can be carried out quickly for installing such wind turbines.

The basic idea of the invention is, on the one hand, to design the geometry in the horizontal and in the vertical extent of the system such that the loads occurring on the rotor and/or on the energy conversion unit are dissipated, as directly as possible, into the foundation without the bending or torsional moments occurring on the tower. By intercepting the tensile and compressive forces acting on the tower of the wind turbine and the minimization, associated therewith, of the bending moment acting on the tower, it is possible, to reduce the horizontal and vertical extent of the foundation such that the wind turbine designed according to the invention is suitable both for large and also for small water depths.

A further basic idea of the invention is to transport a fully functional offshore wind turbine, exhibiting a floating foundation, to the location of its use to connect it there to at least one pre-installed anchoring means, anchored to the sea bed, or to a buoyancy body connected thereto and in total to lower it to a level, by flooding the foundation, where the entire foundation is arranged below the water line. For this purpose it is particularly envisaged that the anchoring means anchored to the bed of the water, for example anchor chains or anchor ropes, are held in position jointly by a single buoyancy body or individually by at least in each case one buoyancy body, in the manner floating at the surface. Further a previously laid submarine cable is secured at the predetermined location of the installation likewise by a buoyancy body, so that the wind turbine only has to be connected mechanically to the floating body/bodies or the anchoring means and electrically to the submarine rope.

The invention therefore relates to a floating wind turbine designed as a downwind turbine, that exhibits a floating foundation, a tower which is rotationally fixedly arranged on the floating foundation, an energy conversion unit which is mounted on the tower, comprises a rotor and is rotationally fixedly connected to the tower, and at least one tensioning element which connects the tower or the energy conversion unit to the foundation in the upwind direction. According to the invention, the foundation furthermore exhibits three legs, one leg of which is longer than the other two legs, the legs being interconnected in a Y shape and the tower being arranged on the foundation in the connecting region of the legs, and the longest leg extending in the upwind direction and being connected to the tower or to the energy conversion unit by means of the tensioning element.

The floating downwind turbine preferably exhibits at least one further tensioning element running on both sides of the wind turbine at right angles to the rotor axis obliquely downwind, for taking up transverse forces, that connects the tower or the energy conversion unit to in each case one of the shorter legs of the foundation.

In the preferred case, the tensioning elements form the edges of an imaginary tetrahedron, the tetrahedron edges being formed by the attachment points of the tensioning elements at the legs and the attachment point at the energy conversion unit and/or of the tower.

Over and above this, according to a preferred design there are provided at the tower cross trees arranged at right angles to the rotor axis and bracing elements connecting the energy conversion unit and/or the tower and/or the foundation to the cross trees.

The already mentioned tensioning elements are preferably designed as ropes, in particular steel ropes being used. As an alternative, it is also possible to use spacing rods.

In relation to the foundation, the tower is preferably inclined in the downwind direction by up to 20°, the tower particularly preferably exhibiting, at least in sections, a profile supporting the wind direction tracking of the wind turbine. This profile also reduces the formation of vortices in the wake flow. The inclination of the tower on the one hand increases the distance of the blades to the tower and on the other hand also creates as a result of the tower head weight a counter moment in the case of braking loads with a negative thrust.

It is advantageous if the two short legs of the foundation are of identical length. As an alternative, the short legs can also be designed to have differing lengths to counter the torque occurring at the rotor.

The foundation is preferably produced as a hollow body from concrete and exhibits a wall thickness between 20 and 60 cm. In this case the components, forming three legs or one leg, of the foundation are braced relative to each other specifically by means by wire strands extending in the wall of the foundation. To this end, for example pipes are cast into the preferably 20 up to 60 cm thick wall of the foundation, through which subsequently wire strands are guided that provide for a bracing of the concrete parts relative to each other and thus counter the low tensile strength of the concrete.

As an alternative, the foundation can also be produced from steel.

Since the foundation is designed as a hollow body, the floating foundation can receive water for example by means of pumps and thus the immersion depth of the foundation can be regulated. Thus for example it is provided that the foundation, without carrying along ballast water, exhibits an immersion depth of approximately 2.80 m, whereas the foundation, by flooding the foundation, that is by taking up ballast water can be lowered to approximately 15 m below the water line.

The foundation can likewise also be employed for trimming the floating wind turbine. For trimming purposes, the floating wind turbine therefore preferably exhibits a device for receiving and discharging ballast water. For receiving and discharging ballast water, this device here uses the hollow space provided in the foundation that can also be subdivided into a plurality of trimming tanks.

In the case of the inventively designed floating wind turbine, trimming can be carried out in a particularly simple manner:

Without wind load, the floating wind turbine is to be sized such that the foundation is aligned horizontally. Since the floating wind turbine is designed as a downwind turbine in such way that the entire system including the foundation can turn away from the wind, the wind load at the energy conversion unit can only have as a result that the downwind directed buoyancy bodies, connected to the short legs, are forced under water and the upwind directed buoyancy body, connected to the long leg, is lifted out of the water—as a result the system would have a downwind directed list.

To bring the system again into the horizontal position, it is therefore only necessary to increase the weight of the long leg by receiving water, it being possible for the weight increase to be relatively low on account of the lever rules. When necessary, (additional) sea water can be pumped into a hollow space arranged in the long leg, to effect a lowering of the long leg as a result of the increase in the total weight of the long leg.

According to a particularly preferred design of the invention however a buoyancy body is provided on in each case a free end of in each case one leg of the foundation, that is preferably manufactured from fibre-reinforced plastic. These buoyancy bodies are preferably connected in each case in an articulated manner, for example by means of wire ropes, to the free end of in each case one leg of the foundation and are particularly preferably of conical design, the deck area or the tip of the conically designed buoyancy bodies being connected to the free and of in each case one leg of the foundation. On account of this progressive buoyancy profile of the buoyancy bodies, the system is better stabilized in the horizontal direction in the case of a load.

In addition to the previously mentioned buoyancy bodies, at the free ends of the legs also cylindrical buoyancy bodies (without progressive or degressive buoyancy profile) can be arranged. They are either in each case connected firmly or by means of a link to a free end of a leg. Here the link can be designed as a simple hinge having a degree of freedom or as a link having more degrees of freedom.

In particular it is provided that the free ends of the short legs exhibit buoyancy bodies that generate a larger buoyancy than the buoyancy body connected to the free end of the long leg.

In this design it is advantageous if in addition to the tanks arranged in the legs of the foundation, in the mutual connecting region of the arms a trimming tank is provided that is thus arranged below the tower. By regulating the water level as a function of the wind load acting on the rotor only in this trimming tank, a horizontal alignment of the foundation can be maintained. In the normal case, the trimming tank below the tower is flooded up to a predetermined level so that the foundation is horizontally aligned. If the wind load acting on the rotor increases and the foundation starts to list in the downwind direction, this trimming tank can be emptied (partially) by introducing pressurized air and thus the weight of the foundation can be reduced in this area so that the horizontal alignment of the foundation and thus of the system is maintained despite high wind loads. If the wind load is removed again, the trimming tank is again flooded to its original level. This process is controlled by a control unit that is connected to an inclination-measuring system that detects the horizontal alignment of the foundation, and acting on pumps and/or compressors, connected thereto, and correspondingly provided emptying valves.

The floating wind turbine is finally preferably fitted with a rotor that is designed as a two-blade rotor, the energy conversion unit particularly preferably being designed as a Super Compact Drive.

For installing the inventive floating wind turbine at a predetermined location or at a predetermined position in a body of water, after completion of the wind turbine in a dock the following steps are requisite: a. laying a submarine cable to a predetermined location where the downwind turbine is to be installed, b. anchoring at least one anchoring means at the predetermined location and connecting the anchoring means to a floating body, c. transporting the floating downwind turbine to the predetermined location, d. connecting the floating body or the anchoring means and the submarine cable to the floating downwind turbine, and e. lowering the downwind turbine, connected to the floating body or the anchoring means and the submarine cable, by flooding the floating foundation, the steps c), d) and e) being carried out in the sequence c-d-e, c-e-d or e-c-d.

Preferably the submarine cable, too, that is kept in readiness for the electrical connection to the wind turbine, is connected to its own floating body.

A simple and speedy installation method can therefore consist in that at first the submarine cable is laid and connected to a floating body and then the anchoring means for each wind turbine are anchored on the sea bed and connected in each case to its own floating body (or a joint floating body). The floating bodies therefore make it easy to find the installation site and permit access to anchoring means and submarine cable directly at the surface of the water. If the wind turbine is towed to the site of the installation, the connection between the anchoring means and the submarine cable can therefore take place by simple access at the surface of the water and the wind turbine can subsequently be put into the operational state by flooding the foundation.

As a first alternative, a floating wind turbine can also be towed to the installation site, initially lowered there, and then connected up. As a further alternative, it is also possible to tow a lowered floating wind turbine to the installation site and connected up directly in a next step.

If only a single floating body is used for marking and for furnishing anchoring means and submarine cables, the floating body is particularly preferably designed such that while mechanically connecting the wind turbine to the floating body there is preferable also created an electric contact between the floating downwind turbine and the submarine cable.

Transporting the floating downwind turbine is preferably accomplished by towing by means of at least one watercraft, the floating downwind turbine being towed with the long leg ahead.

Particularly preferably, transporting the floating downwind turbine is, however, carried out by towing by means of two watercraft, the two watercraft, for approaching the floating downwind turbine to the floating body, run past the floating body with the latter in-between.

BRIEF DESCRIPTION OF THE DRAWINGS

The invention is explained in more detail using a particularly preferably designed exemplary embodiment illustrated in the attached drawings. In the drawings.

DETAILED DESCRIPTION OF THE INVENTION

Figure 1:
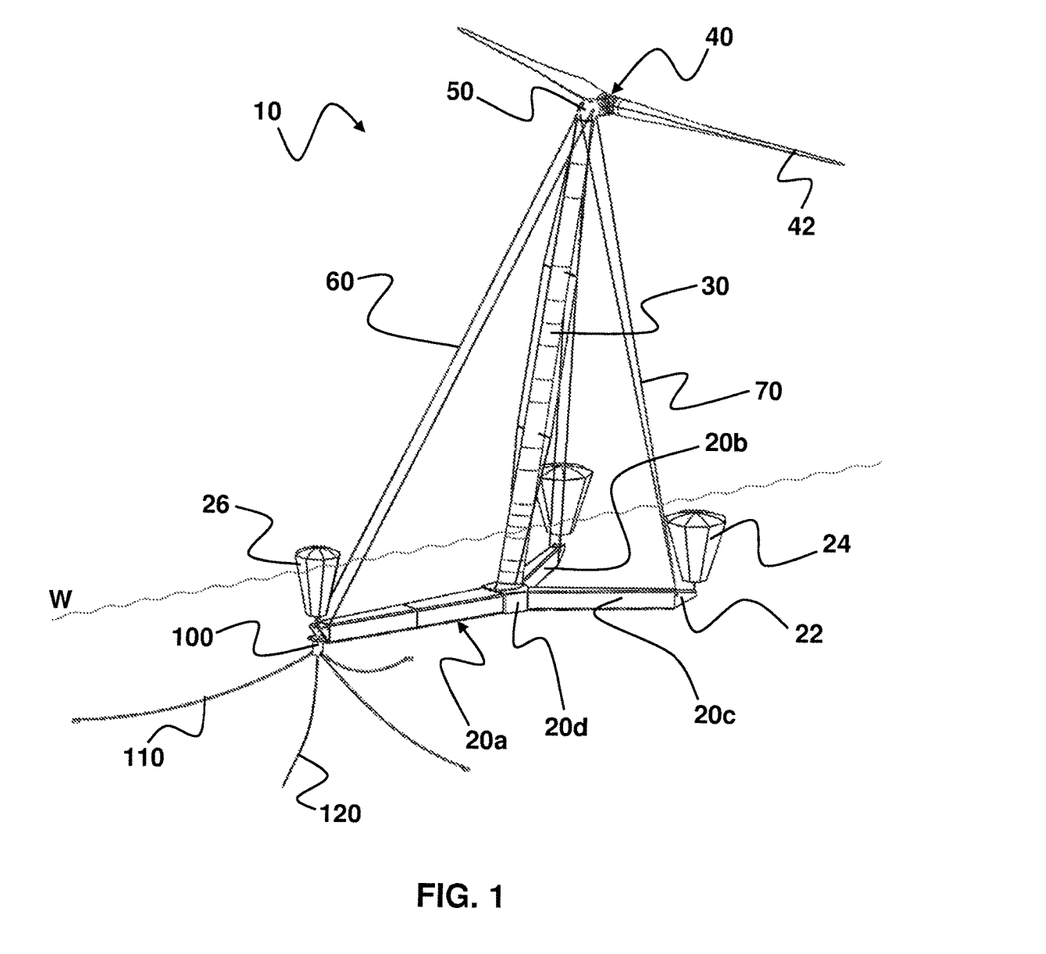
FIG. 1 shows a perspective view of a particularly preferably designed floating wind turbine according to the invention obliquely from upwind.
Figure 2:
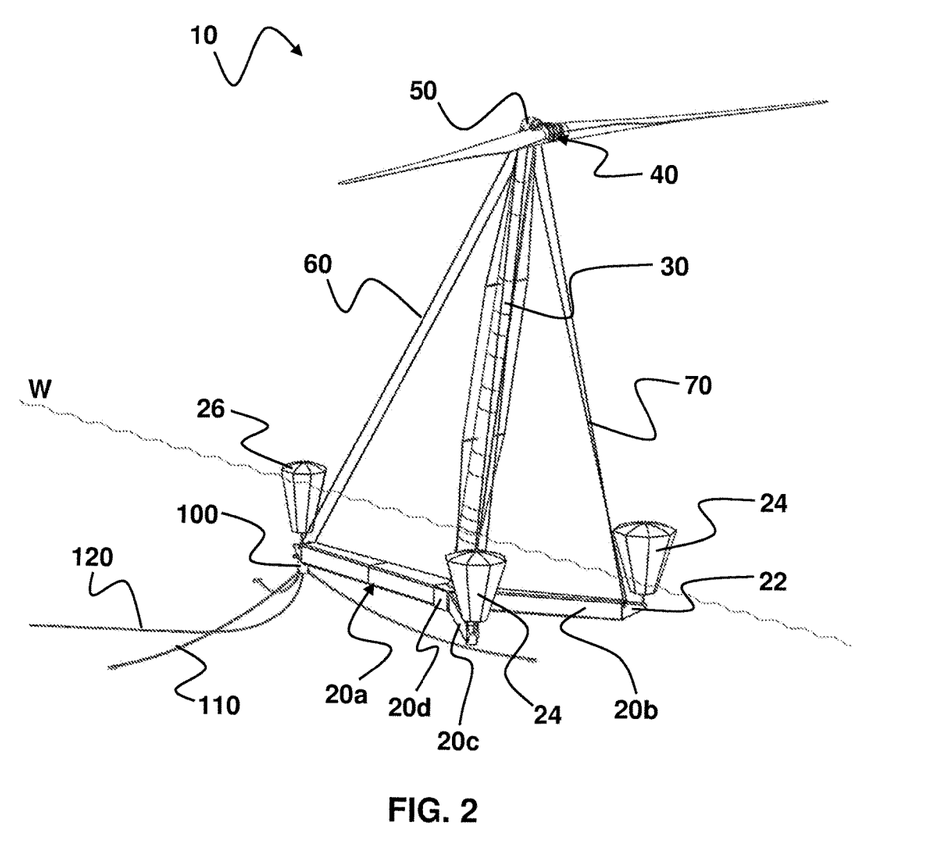
FIG. 2 shows the perspective view of the particularly preferably designed floating wind turbine from FIG. 1 obliquely from downwind.

FIG. 1 shows a perspective view of a particularly preferably designed floating offshore wind turbine 10 at the site of a pre-installed floating body 100 for anchoring the floating wind turbine 10 on the sea bed obliquely from upwind, whereas FIG. 2 illustrates a perspective view of this wind turbine obliquely from downwind.

The floating wind turbine 10 exhibits a floating foundation 20 that—as will be detailed subsequently—is of three-leg design, the leg 20a connected to the floating body 100 being longer than the two other legs 20b, 20c. During operation of the wind turbine 10, the floating foundation 20 is arranged completely below the water line W. The legs 20a, 20b, 20c are in each case connected at their free ends to a buoyancy body 24, 26, the buoyancy bodies 24 arranged at the short legs 20b, 20c being designed such that they exhibit a larger buoyancy than the buoyancy body 26 arranged at the long leg 20a. The buoyancy bodies 24, 26 are in each case illustrated having a progressive buoyancy profile, which impedes a sinking of the foundation below the water line W. However, it can also be imagined that the buoyancy body 26 connected to the long leg 20a exhibits a degressive buoyancy profile and thus impedes an emersion.

The three legs 20a, 20b, 20c are interconnected by means of a further connecting element 20d belonging to the foundation 20, that is designed as a pedestal for the tower 30. To this end, the connecting element 20d exhibits on its upper side a surface inclined downwind relative to the horizontal direction up to 20°, that effects an inclination of the tower 30 that deviates from the vertical direction by up to 20°.

The connecting element 20d preferably receives the trimming tank explained above, that counteracts an immersion of the short legs 20b, 20c in the case of a wind load.

The tower 30 itself is rotationally fixedly connected to the floating foundation 20 on the one hand and the energy conversion unit 50 arranged on the tower on the other hand, the tower 30 particularly preferably exhibiting, at least in sections, a profile that supports the wind direction tracking of the wind turbine 10. The energy conversion unit 50 arranged on the tower 30 is preferably provided as a Super Compact Drive, i.e. having load-transferring housings formed in the shape of a head support and preferably connected to a rotor 40 exhibiting two rotor blades 42.

Furthermore the energy conversion unit 50 is preferably connected to the long leg 20a of the foundation 20 by means of two tensioning elements 60 that run in the downwind direction. On top of this, the energy conversion unit 50 is connected to the short legs 20b, 20c of the foundation 20 by means of in each case two further tensioning elements 70. So that the greatest possible stability of the floating system can be achieved, the tensioning elements 60 and the further tensioning elements 70 are in each case attached to the free ends of the legs 20a, 20b, 20c. For this purpose, the foundation 20, preferably made from concrete, exhibits terminating plates 22 made from metal that exhibit both an attachment point for the tensioning element 60, the further bracing elements 70 and the buoyancy bodies 24, 26.

Here it is compulsory for the floating wind turbine 10 to be designed as a downwind turbine, a yaw drive being dispensed with for reasons of a simple structure, low weight, a simple construction and for avoiding collisions with the further tensioning elements 70. The system 10, with its compact structure, can also be erected completely onshore and towed to the site of the offshore wind turbine installation where a floating element 100 anchored to the sea bed by means of anchoring means 110, e.g. chains or (steel or polyester) ropes, is pre-installed and that is already connected to a submarine cable 120. When the erection site is reached, it is therefore only necessary to connect the floating wind turbine 10 to the pre-installed floating body 100 that floats at the water surface W and to lower the system to below the water line W by flooding the foundation 20, the floating body 100, in addition to the mechanical coupling of offshore wind turbine 10 and floating body 100, at the same time also keeping elements in readiness for electrically connecting the offshore wind turbine 10 and the submarine cable 120.

When connecting the floating foundation 20 to the anchoring means 110 or to the floating body (bodies) 100 connected to the anchoring means 110, basically care has to be taken that the wind turbine 10 continues to be able to move freely about the anchoring means 110. As a result, the link between the anchoring means 110 (or the floating body 100) and the foundation 20 should take place by a rotary joint, so that the wind turbine 10 remains freely rotatable about the anchoring means 110 in the case of changes in the wind direction, without the anchoring means 110 becoming mutually twisted.

On top of this, the anchoring means 110 will lift off from the sea bed on account of the tensile force that is exerted by the wind turbine 10 on the anchoring means 110 in the case of a wind load, thus changing the angle of the connection between the anchoring means 110 and the foundation 20. In addition to the pivot bearing, it should also be possible for the connection between the anchoring means 110 (or the floating body 100) and the foundation 20 to swivel by means of a swivel bearing.

For the electrical connection between the submarine cable 120 and the electrical devices of the wind turbine 10, in particular a slip-ring transmission is envisaged. If the wind turbine 10 is equipped with its own drive (see below), a slip ring can also be dispensed with in the case of corresponding manoeuvring of the system 10 that suppresses a rotary movement of the wind turbine 10 about the anchoring by more than 360°, and instead a simple contacting can be envisaged, for example a plug contact.

It is further in particular envisaged that the lower edge of the foundation 20 is lowered to approximately 20 m below the water line W in the case of a vertical elongation of the foundation 20 by approximately 5 m by taking up water into the foundation 20. This dimensioning of the inventively designed floating wind turbine 10 thus makes possible on the one hand the manufacture in ports having a rather low water depth, since prior to flooding, the floating foundation 20 exhibits only a low immersion depth of a few meters (approximately 2.80 m). On the other hand, the system 10 is dimensioned such that the system 10 is also suitable for low water depths starting from approximately 30 m by lowering to 20 m below the water line and stabilizing the buoyancy bodies 24, 26 that only start their function after lowering.

The alignment of the offshore wind turbine 10 than takes place automatically about the floating body 100 anchored to the sea bed depending on the prevailing wind direction. Since the floating body 10 will execute a circular path on the surface of the water in the case of a change in wind direction, it is advantageous to provide for a symmetrical arrangement of the anchoring points on the sea bed: in the case of three anchoring means 110, their anchoring is preferably arranged on the sea bed on an imaginary circle at a distance of in each case 120°, so that a uniform load distribution is ensured.

Even though the floating wind turbine 10 according to the invention is in principle designed to be self-aligning, an offset relative to the optimum wind direction can occur on account of currents or waves. Therefore the floating wind turbine 10 preferably also exhibits a device for registering the rotation of the wind turbine 10 about the floating body 100 can be provided and, so as to optimize the alignment according to the wind direction, a drive similar to a transverse thruster can used to align the wind turbine 10 in the wind for energy generation in an optimum manner or for avoiding overload.

Figure 3:
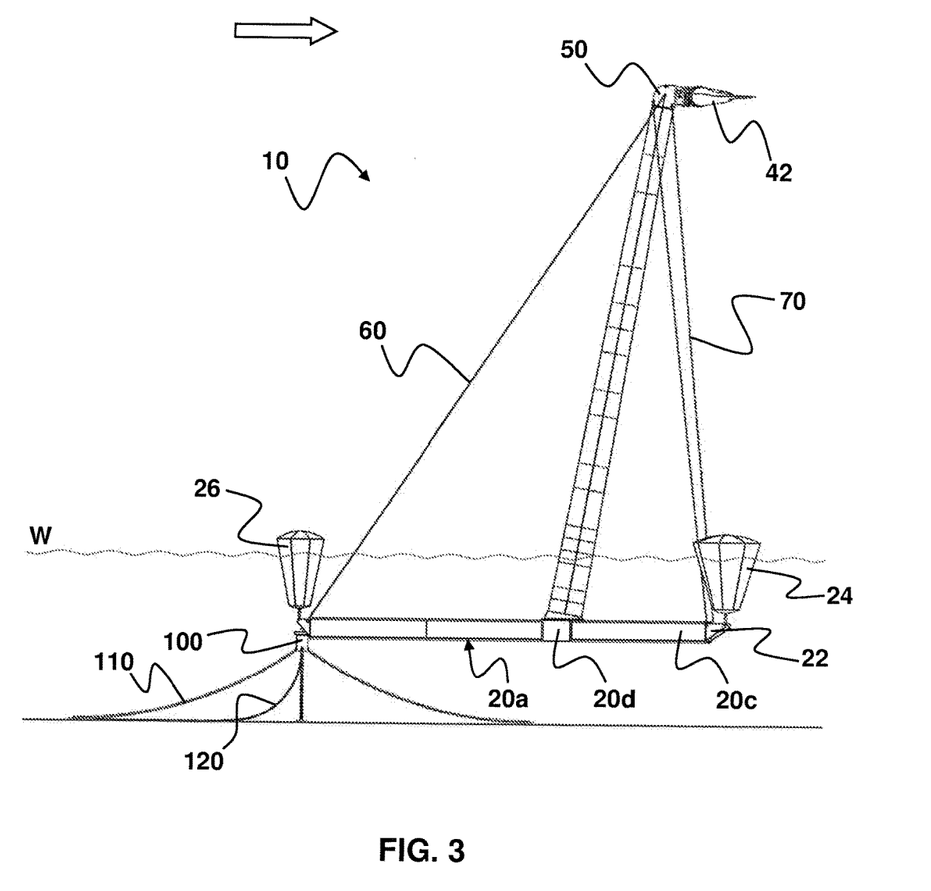
FIG. 3 shows a side view of the floating wind turbine from FIG. 1.

FIG. 3 shows a side view of the floating wind turbine from FIG. 1. In this illustration the inclination of the tower in the downwind direction and the bracing of the tower 30 in the upwind direction along the axis of the long leg 20a of the foundation 20 can be clearly seen. It can likewise be recognised that the buoyancy bodies 24 arranged downward at the short legs 20b, 20c are larger than the buoyancy body 26 arranged upwind at the long leg 20a of the foundation 20.

By automatically aligning the floating wind turbine 10 as a function of the wind direction (see arrow) on the one hand for avoiding bending moments the tower 30 is reinforced by the tensioning element 60, in that the tensioning element 60 takes up the thrust force acting on the energy conversion unit 50. On the other hand, in the case of high wind loads the floating wind turbine 10 is stabilized horizontally by designing the buoyancy bodies 24 arranged at the short legs 20b, 20c with a high degree of buoyancy. Since in particular the floating wind turbine 10 is designed as a downwind turbine, so that the entire system including foundation 20 rotates out of the wind, the wind load at the energy conversion unit 50 can only result in that the short legs 20b, 20c directed downwind are pushed under water and the long leg 20a directed upwind is lifted out of the water—the system would therefore list downwind. The construction and differing design, previously mentioned, of the buoyancy bodies 24, 26 therefore effectively prevent a listing of the wind turbine 10.

Figure 4:
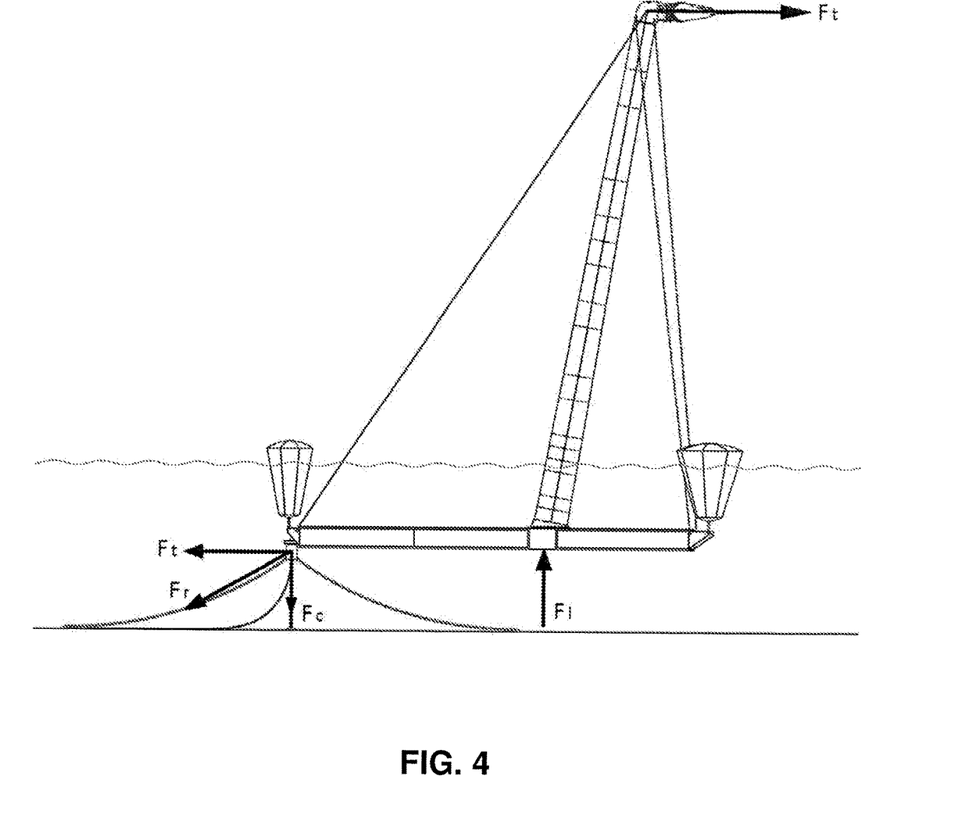
FIG. 4 shows a side view of the floating wind turbine from FIG. 1, where the forces acting on the wind turbine are illustrated.

FIG. 4 shows a side view, that is identical to FIG. 3, of the floating wind turbine from FIG. 1, where the forces acting on the wind turbine have been drawn. It is in particular illustrated that when tying the anchoring means 120 to the free end of the long leg 20a of the wind turbine 10 the thrust force Ft acting on the rotor 40 can be effectively dissipated into the sea bed at the attachment point as a resulting force Fr. The buoyant force F1 generated by the connecting element 20d counteracts the weight of the tower and represents a counterforce that equalizes the rotor thrust and is designed to keep the system in a static equilibrium.

Figure 5:
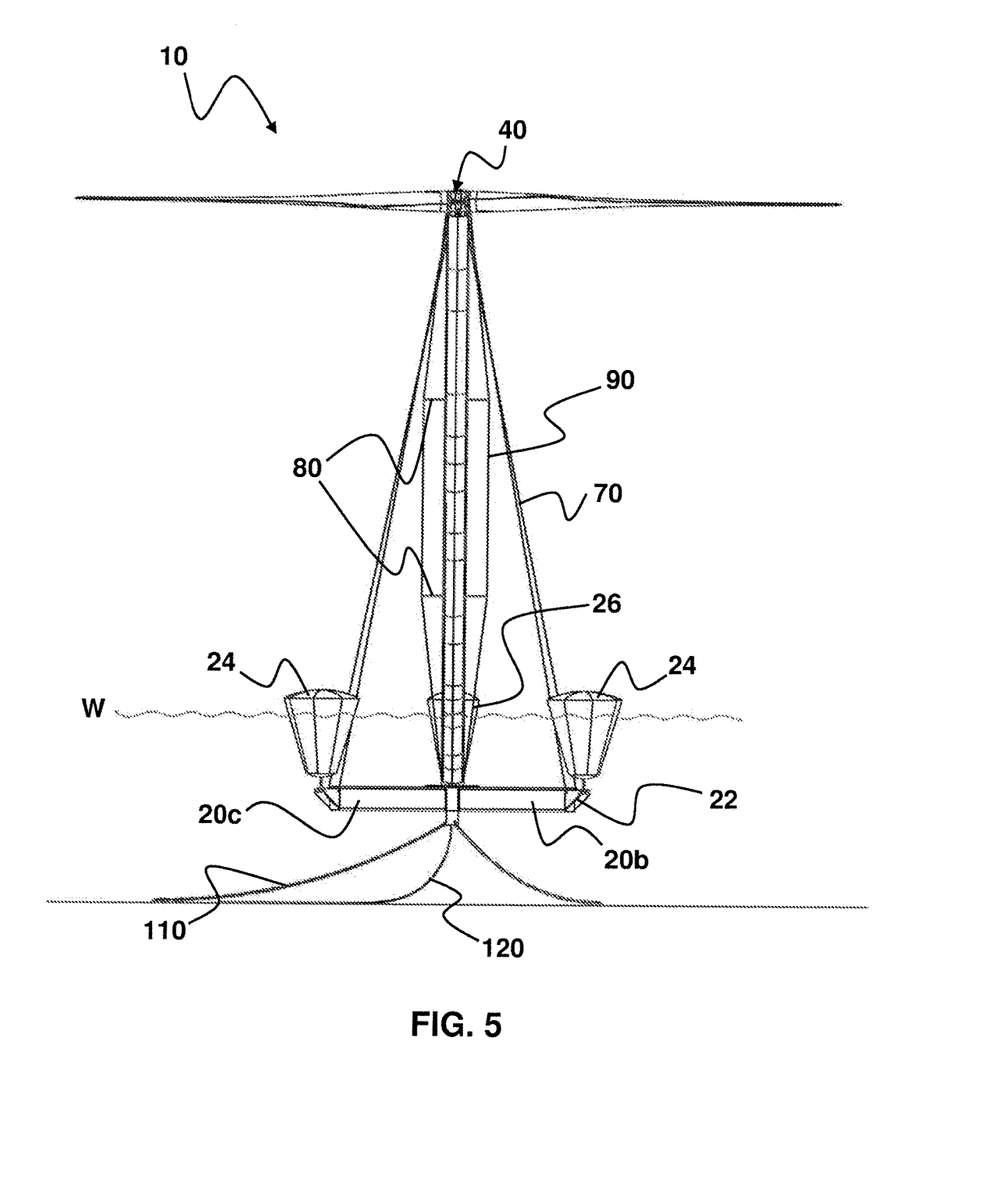
FIG. 5 shows a front view of the floating wind turbine from FIG. 1 in the upwind direction.

FIG. 5 shows a front view of the floating wind turbine in the upwind direction that now also shows on the one hand the tensioning elements 70 arranged transversely to the rotor axis, that connect the energy conversion unit 50 to the short legs 20b, 20c of the foundation 20, and the bracings element 90 connecting the energy conversion unit 50 and/or the tower 30 and/or the foundation 20 to the cross trees 80, that increase the transverse stiffness of the tower 30.

Figure 6:
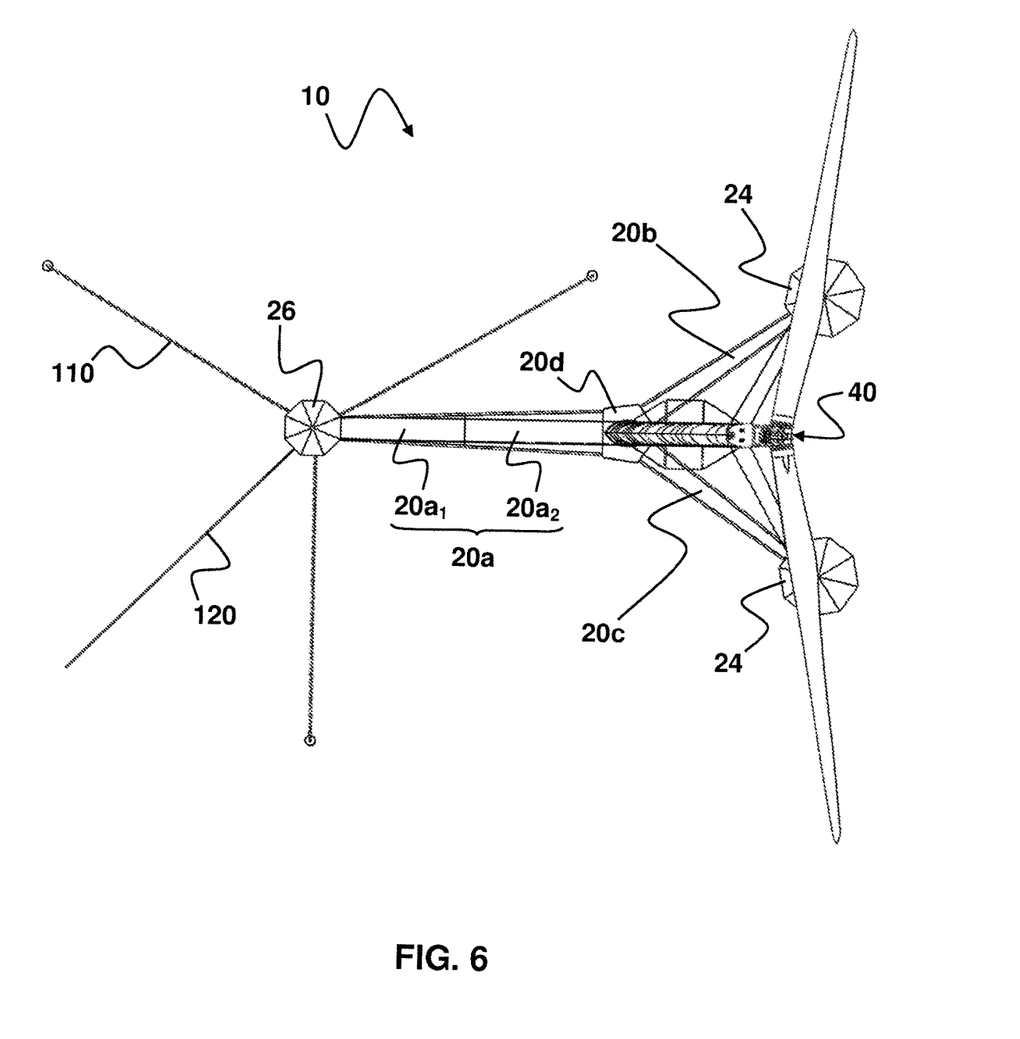
FIG. 6 shows a top view of the floating wind turbine from FIG. 1.

FIG. 6 further shows a top view of the particularly preferably designed floating wind turbine 10 in which the symmetrical formation of the foundation 20 can be recognized particularly clearly. The three legs 20a, 20b, 20c of the foundation 20 are interconnected by the connecting element 20d on which the tower 30 is arranged. The long leg 20a is preferably of two-part design as a result of the individual elements $20a_1$, $20a_2$, that is approximately 60 m long in the case of a tower height of approximately 100 m, whereas the short legs 20b, 20c are designed to be approximately 30 m long.

For trimming the system 10, on the one hand the individual element $20a_1$ can preferably exhibit a chamber that can be filled with sea water independently of other trimming tanks so as to increase the weight of the long leg 20a.

On the other hand, the connecting element 20d can be designed as a single trimming tank such that under wind load for increasing the buoyancy of the element 20d carrying the tower 30 pressurized air can be guided into the trimming tank of the connecting element 20d by means of a compressor and the water present in this trimming tank can be discharged from the trimming tank under weight reduction for increasing the buoyancy of the connecting element 20d. If the thrust force acting on the system is reduced as a result of the decreasing wind speed, the trimming tank can be flooded again simple be de-aerating, the original level that is present in the trimming tank and stabilizing the system 10 in the horizontal direction being assumed again. As is described above with reference to FIG. 3, the buoyant force F1 produced by the connecting element 20d thus represents a force acting counter to the rotor thrust and keeps the system in the horizontal position.

Relative to the longitudinal axis of the long leg 20a, the short legs 20b, 20c are preferably arranged mirror-symmetrically, the angle between the long leg 20a and one of the short legs 20b, 20c being larger than 90° and smaller than 130°, preferably about 125°, the angle between the short legs 20b, 20c therefore correspondingly preferably amounting to approximately 110°. The two short legs are slightly spread in the downwind direction and approximately at the same level as the energy conversion unit 50, so that particularly preferably the attachment points of the further tensioning element 70 at the foundation 20 are situated in front of the attachment points of the further tensioning elements 70 at the energy conversion unit 50 or the tower 30, so that the braking loads occurring at the energy conversion unit 50 can be guided effectively into the foundation 20. The long leg 20a is aligned directly in the rotor axis in the upwind direction, two tensioning elements 60 being provided here.

Figure 7:
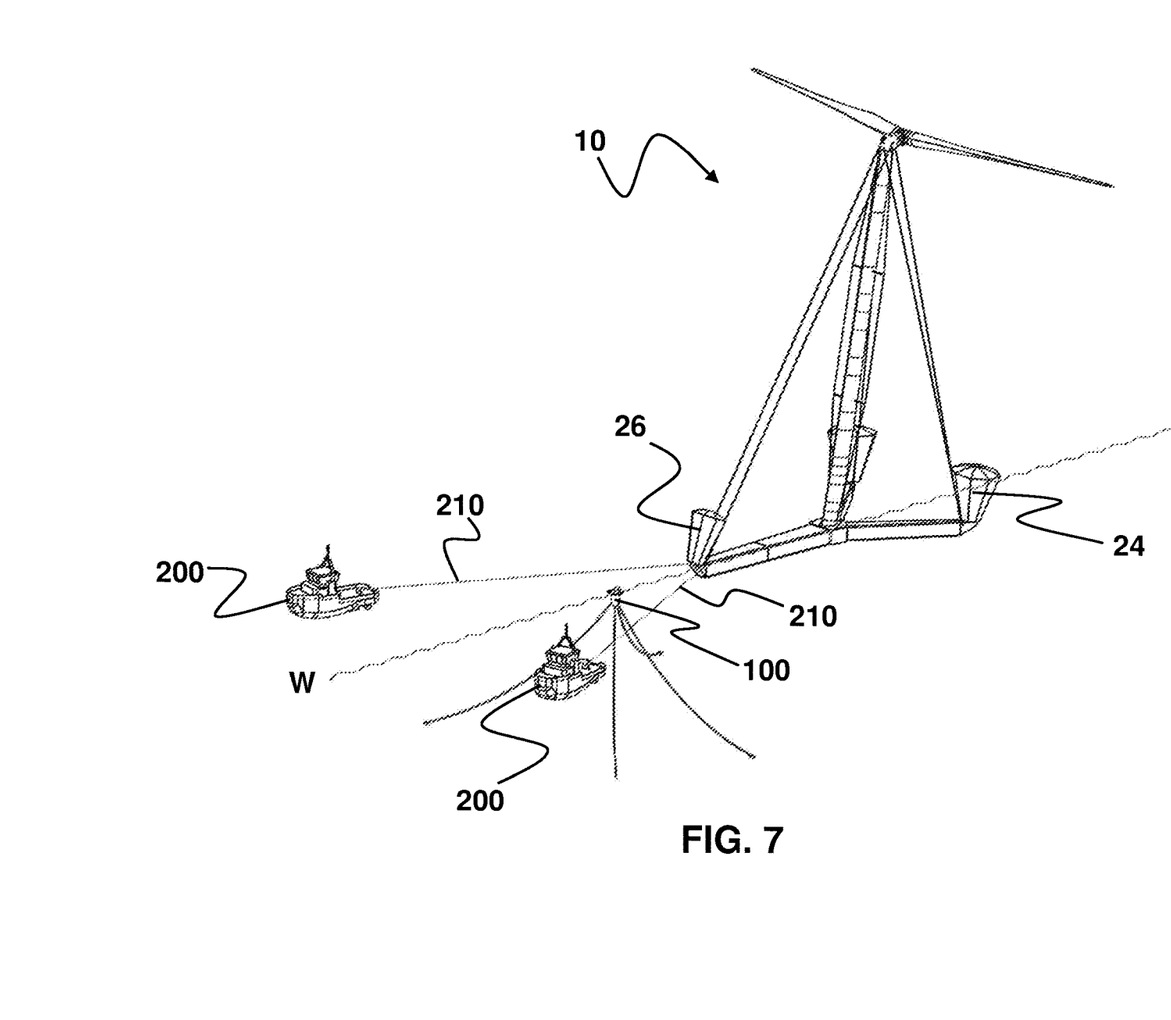
FIG. 7 shows a perspective view of the wind turbine according to the invention during the anchoring process with the aid of two tugs.

FIG. 7 now illustrates a perspective view of the inventive wind turbine towed by two tugs at the site of the installation. By means of ropes 210, the two tugs 200 are connected to the free end of the long leg 20a of the wind turbine 10, so that the flow resistance of the Y shaped floating foundation 20 is low. A further advantage is that the two tugs 200 can easily find the pre-installed anchoring means 110 and the pre-installed submarine cable 120 as a result of the floating body 100 that floats at the water surface W, can take it between themselves and run past it, so that the long leg 20a of the wind turbine 10 can be pulled towards the floating body 100.

Figure 8:
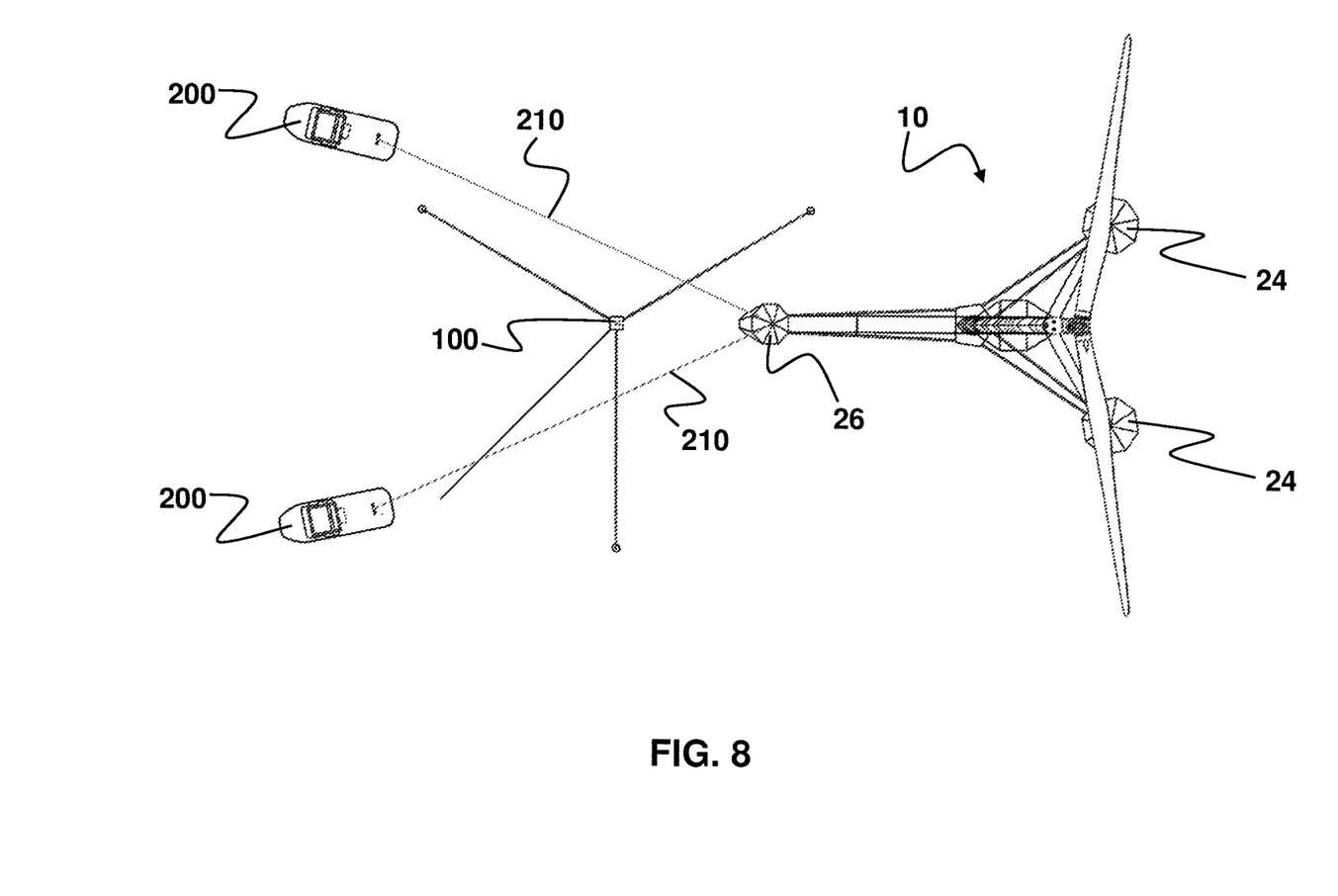
FIG. 8 shows a top view of the wind turbine towed by the two tugs illustrated in FIG. 7.

This link is illustrated in the top view shown in FIG. 8. By means of a suitable manner of steering of the tugs 200 or by means of winches carried along by the tugs 200 and acting on the ropes 210, the wind turbine 10 can be positioned in relation to the floating body 100 such that the wind turbine 10 and the floating body 100 or the anchoring means 110 and the submarine cable 120 can be connected above the water surface W.

Figure 9:
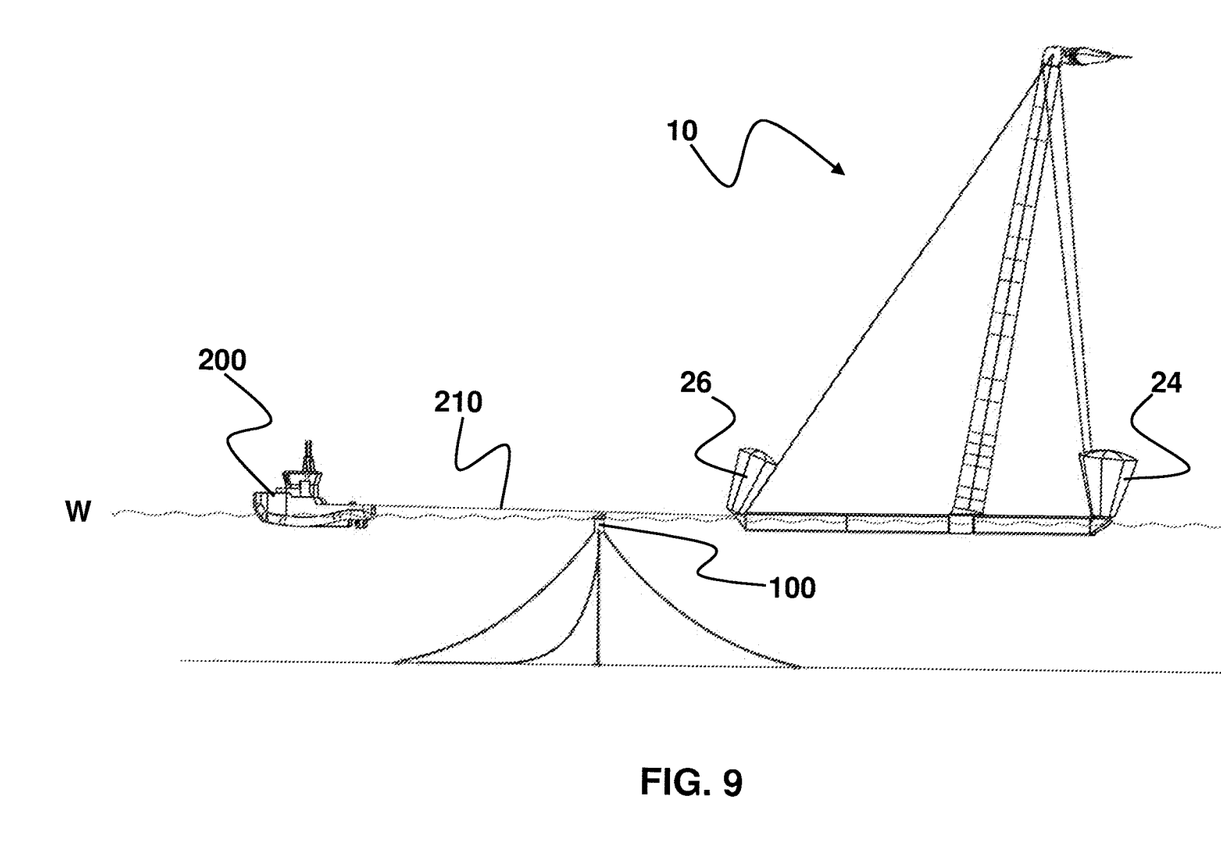
FIG. 9 shows a side view of the wind turbine towed by the two tugs illustrated in FIG. 7.

Here care is also taken—as is finally shown in FIG. 9—that the foundation 20 of the wind turbine 10 can be accessed freely: the buoyancy body 26 and also the buoyancy bodies 24 are without any function during the transport of the wind turbine 10 and preferably secured to the tensioning elements 60, 70. Only after a direct or indirect mechanical connection of the anchoring means 110 to the wind turbine 10 and the production of an electrical connection of the wind turbine 10 to the submarine cable 120 is the foundation 20 of the wind turbine 10 flooded and lowered by means of the floating body 100 to a desired depth of for example 15 m to 20 m, so that the state illustrated in FIG. 3 is assumed. In the process, the buoyancy bodies 24, 26 are released and provide for the stabilization of the floating wind turbine 10 in the horizontal direction.

The invention claimed is:

1. A floating downwind turbine comprising:
    a floating foundation;
    a tower which is rotationally fixed on the floating foundation;
    an energy conversion unit which is mounted on the tower, comprises a rotor and is rotationally fixedly connected to the tower; and
    at least one tensioning element which connects the tower or the energy conversion unit to the foundation in the upwind direction,
    the foundation having three legs, one leg of which is longer than the other two legs,
    the legs being interconnected in a Y shape and the tower, being arranged on the foundation in the connecting region of the legs, and
    the longest leg extending in the upwind direction and being connected to the tower or to the energy conversion unit by means of the tensioning element.

2. The floating downwind turbine according to claim 1, characterized by at least one further tensioning element that runs transversely to the rotor axis on both sides of the wind turbine, that connects the tower or the energy conversion unit to in each case one of the shorter legs of the foundation.

3. The floating downwind turbine according to claim 1, characterized by cross trees arranged transversely to the rotor axis at the tower and bracing elements connecting the energy conversion unit and/or the tower and/or the foundation to the cross trees.

4. The floating downwind turbine according to claim 1, characterized in that the tower is inclined in the downwind direction by up to 20° relative to the foundation.

5. The floating downwind turbine according to claim 1, characterized in that the tower exhibits, at least in sections, a profile supporting the wind direction tracking of the wind turbine.

6. The floating downwind turbine according to claim 1, characterized in that the two other legs are of equal length.

7. The floating downwind turbine according to claim 1, characterized in that the foundation is designed as a hollow body.

8. The floating downwind turbine according to claim 7, characterized in that the foundation is manufactured from concrete and exhibits a wall thickness between 20 and 60 cm.

9. The floating downwind turbine according to claim 8, characterized in that the legs are braced relative to each other by means of wire strands running in the wall of the foundation.

10. The floating downwind turbine according to claim 1, characterized by buoyancy bodies in each case arranged with the free end of in each case one leg of the foundation.

11. The floating downwind turbine according to claim 10, characterized in that the buoyancy bodies are in each case connected in an articulated manner to the free end of in each case one leg of the foundation.

12. The floating downwind turbine according to claim 10, characterized in that the buoyancy bodies are of conical design, a deck area or the tip of the conically designed buoyancy bodies being connected to the free of in each case one leg of the foundation.

13. The floating downwind turbine according to claim 10, characterized in that the buoyancy bodies arranged at the short legs generate a larger buoyancy than the buoyancy body arranged on the long leg.

14. The floating downwind turbine according to claim 10, characterized in that the buoyancy bodies arranged at the short legs exhibit a progressive buoyancy profile and the buoyancy body arranged at the long leg exhibits a degressive buoyancy profile.

15. The floating downwind turbine according to claim 1, characterized in that the long leg exhibits in the area of the attachment point for the tensioning element a connecting means for connecting with at least one anchoring means anchoring the floating downwind turbine on the sea bed.

16. The floating downwind turbine according to claim 15, characterized in that the connection means exhibits a pivot bearing and/or a swivel bearing.

17. The floating downwind turbine according to claim 1, characterized in that the floating downwind turbine exhibits a transverse thrust system.

18. The floating downwind turbine according to claim 1, characterized in that the rotor is a two-blade rotor.

19. The floating downwind turbine according to claim 1, characterized in that the energy conversion unit is designed as a Super Compact Drive (SCD).

20. A method for installing the floating downwind turbine according to claim 1, having the steps:
 a. laying a submarine cable to a predetermined location where the downwind turbine is to be installed,
 b. anchoring at least one anchoring means at the predetermined location and connecting the anchoring means to a floating body,
 c. transporting the floating downwind turbine to the predetermined location,
 d. connecting the floating body or the anchoring means and the submarine cable to the floating downwind turbine, and
 e. lowering the downwind turbine, connected to the floating body or the anchoring means and the submarine cable, by flooding the floating foundation,
 the steps c), d) and e) being carried out in the sequence c-d-e, c-e-d or e-c-d.

21. The method according to claim 20, characterized in that laying the submarine cable involves connecting the submarine cable to a further floating body.

22. The method according to claim 20, characterized in that the downwind turbine is lowered to such an extent that the foundation is completely arranged below the water line.

23. The method according to claim 20, characterized by connecting the connecting means arranged at the long leg of the floating downwind turbine to a plurality on anchoring means.

24. The method according to claim 20, characterized in that connecting the floating body to the floating downwind turbine involves the making of an electric contact of the floating downwind turbine to the submarine cable.

25. The method according to claim 20, characterized in that transporting the floating downwind turbine takes place by towing by means of at least one watercraft, the floating downwind turbine being towed with the long leg ahead.

26. The method according to claim 20, characterized in that transporting the floating downwind turbine takes place by towing by two watercraft, wherein the two watercraft, to transport the floating downwind turbine to the floating body, run past the floating body with the floating body between the two watercraft.

* * * * *